United States Patent

Dahotre et al.

Patent Number: 5,503,703
Date of Patent: Apr. 2, 1996

[54] LASER BONDING PROCESS

[76] Inventors: Narendra B. Dahotre, 102 Blanton Ct., Tullahoma, Tenn. 37388; Mary H. McCay; T. Dwayne McCay, both of 1296 Old Estill Springs Rd., Winchester, Tenn. 37398

[21] Appl. No.: 179,363

[22] Filed: Jan. 10, 1994

[51] Int. Cl.$^6$ ............................ B32B 31/06; B32B 31/26
[52] U.S. Cl. ..................... 156/272.8; 156/89; 264/60
[58] Field of Search .................... 156/89, 272.8; 264/60; 427/559, 596; 501/96

[56] References Cited

U.S. PATENT DOCUMENTS

| | | | |
|---|---|---|---|
| 2,771,969 | 11/1956 | Brownlow | 156/89 X |
| 2,800,710 | 7/1957 | Dunn | 29/473.1 |
| 2,857,663 | 10/1958 | Beggs | 29/473.1 |
| 3,607,613 | 9/1971 | Passmore et al. | 156/89 X |
| 3,797,100 | 3/1974 | Browne | 228/102 |
| 3,839,779 | 10/1974 | Walker | 29/472.9 |
| 3,915,369 | 10/1975 | Schmidt-Bruecken et al. | 228/194 |
| 4,109,031 | 8/1978 | Marscher | 228/122.1 X |
| 4,419,161 | 12/1983 | Hailey | 156/89 |
| 4,446,169 | 5/1984 | Castle et al. | 501/88 X |
| 4,691,093 | 9/1987 | Banas et al. | 219/121 |
| 4,713,520 | 12/1987 | Van Nice et al. | 219/121 |
| 4,762,269 | 8/1988 | Gyarmati et al. | 228/194 |
| 4,763,828 | 8/1988 | Fukaya et al. | 228/124 |
| 4,782,209 | 11/1988 | Caers et al. | 219/121.64 |
| 4,914,269 | 4/1990 | Kinsman et al. | 219/121.64 |
| 4,917,958 | 4/1990 | Akai et al. | 156/89 X |
| 4,988,645 | 1/1991 | Holt et al. | 501/88 X |
| 5,198,188 | 3/1993 | Holt et al. | 427/224 X |

FOREIGN PATENT DOCUMENTS

| | | |
|---|---|---|
| 154290 | 11/1981 | Japan . |
| 179882 | 8/1987 | Japan . |

Primary Examiner—David A. Simmons
Assistant Examiner—M. Curtis Mayes
Attorney, Agent, or Firm—Luedeka, Neely & Graham

[57] ABSTRACT

A process for joining ceramic or ceramic and metal bodies is disclosed. The process involves using an interlayer of a mixture of two materials and reacting the materials with laser irradiation to form a thermally stable compound suitable for bonding the bodies together.

17 Claims, 1 Drawing Sheet

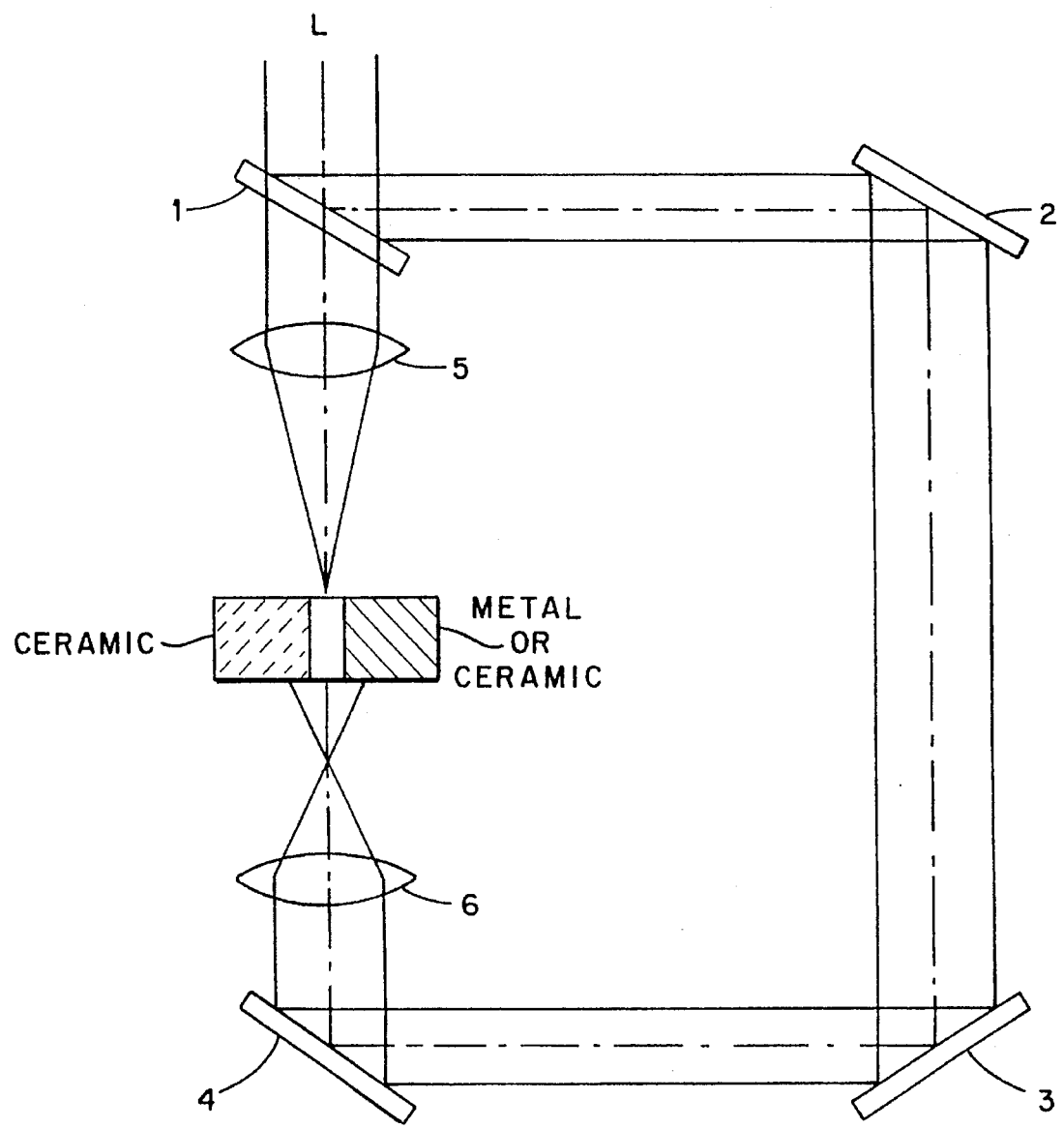

LASER BONDING PROCESS

BACKGROUND OF THE INVENTION

In recent years, a considerable increase in the potential and actual uses of certain ceramics for structural, chemical, electrical and electronic applications has occurred because of the strength, corrosion resistance, electrical conductivity and high temperature stability characteristics of these materials. Major applications for ceramics include $Si_3N_4$/steel and $Si_3N_4$/Al joints in gas turbines and diesel engines, recuperators in heat exchangers, $Si_3N_4$/steel and $Si_3N_4$/Ti joints in fuel cells, and $ZrO_2$/steel joints in friction materials for bearings, bushings, brakes, clutches and other energy absorbing devices. $Al_2O_3$, cordierite and mullite/steel, $Si_3N_4$, and $Al_2O_3$—TiC/steel joints for materials in cutting tools and dies used in metal fabrication, SiC, $Al_2O_3$ and BN/Al and steel joints for space and military applications such as rocket nozzles, armor, missile bearings, gun barrel liners and thermal protection barriers in space vehicles, and SiC/C, $Al_2O_3$/Si and $Al_2O_3$/Cu and Al joints in electronic devices are others.

To perform effectively and efficiently for many of these applications, ceramic components chosen often must coexist with or be bonded with metallic components and form the system as a whole. Integration of ceramic-ceramic/metal hybrid parts into existing engineering designs can significantly enhance the performance of components.

The joining of ceramic parts or ceramic-metal components, however, presents a number of problems. For example, ceramic materials may differ, and certainly ceramics and metals differ greatly in terms of modulus of elasticity, coefficient of thermal expansion, and thermal diffusivity. Accordingly, large thermally induced mechanical stresses are set up in the joint regions during bonding. In the past, this problem has been overcome only with limited success in using common techniques such as diffusion bonding, arc and oxyfuel fusion welding, brazing, soldering, and mechanical attachment. Thus, while diffusion bonding has proven useful for producing joints with good elevated temperature properties, the practicality of this method is limited since it frequently requires vacuum and/or hot pressing equipment. Alternatively, conventional fusion welding techniques create potentially critical conditions, since the material at the interface is superheated for a substantially long time, rises to accelerated reaction rates, and leads to extensive interdiffusion of species. This situation results in the formation of an entirely different microstructure with degraded mechanical and chemical properties. In general, fusion welding may only be considered for materials with low stress applications.

While soldering and brazing techniques are relatively simple to carry out and may be conducted at lower temperatures, the procedure requires elaborate surface preparation, and most importantly, the joints produced are limited to applications which do not involve high strength or high temperature.

Other techniques, such as mechanical interlocking or electron-beam welding, have their own peculiar drawbacks. For example, electron-beam welding requires the use of a vacuum chamber. Additionally, it cannot be used with ease for dielectrics because of charge buildup on the insulating ceramics.

Accordingly, there remains an important need for an improved method of ceramic-ceramic or ceramic-metal bonding. Most importantly, there is a need for such method which produces a bond suitable for high temperature applications. The invention addresses these needs.

SUMMARY OF THE INVENTION

Accordingly, in one embodiment, the invention relates to a method or process for joining ceramic bodies in which, first, a sufficient layer of a mixture of at least two materials or reactants which will react to form a compound having high thermal stability and which will bond to the surfaces of ceramic bodies is interposed between ceramic bodies. The layer is then irradiated with a laser of sufficient intensity to initiate and maintain reaction of the materials throughout the layer to form an interlayer or joint of the compound of high thermal stability. Concurrently with the irradiation, additional heat is supplied to the layer and areas of the ceramic bodies contiguous to the layer from a second heat source to prevent thermal stress of the joint being formed by the compound or composition being produced in the layer. To insure a highly thermally stable joint or bond, the ratio of the reactants in the mixture is proportioned so that unconverted reactants or byproducts (non-gaseous), if any, in the joint layer or composition formed by the irradiation, do not interfere in the bond formation, as described more fully hereinafter.

In a second embodiment of the invention, the process is applied in a similar manner to the bonding or joining of ceramic and metal bodies. In this case the reactants in the initial layer are selected so that the compound formed has not only high thermal stability but characteristics which will produce a good bond with ceramic and the metal chosen.

In a preferred aspect of the invention, other additive materials may be present in the mixture used for the bonding composition.

As used herein, the term "high thermal stability" implies that the compound or material chosen for forming the joint does not decompose or degrade to any significant extent at temperatures below about 600° C., and retains good strength at temperatures significantly above that level. The term "sufficient layer" simply indicates that enough of the reactant materials are present to form a bond at least substantially coextensive with the boundaries of the adjacent ceramic or ceramic and metal bodies sought to be joined. By way of example only, the layer may be of sufficient size that, after laser irradiation, ignition and cooling, the resulting bond or joint may be from 0.1 mm to 2.0 mm, preferably 0.5 mm to 1.0 mm thickness between the pieces or bodies.

The ceramics to which the joining or bonding procedure of the invention may be employed are those suitable for elevated or high temperature utilization, and include such of those materials mentioned previously. Generally, the invention is applicable to most high temperature carbides, nitrides, and oxides, such as alumina, magnesia, zirconia, spinel, titania, silicon carbide, silicon nitride, boron nitride, ceramic matrix composites, and the like. Ceramic matrix composites are particularly suited to the invention, particularly composites such as $Si_3N_4$/SiC and $Al_2O_3$/SiC. It will be understood that the ceramics bonded together may be of different character. Similarly, the particular metal bonded with a given ceramic are selected from those suitable or intended for high temperature application. The term "metal" is understood to include pure metal or metals, metal alloys, intermetallic compounds, and mixtures thereof. Normally, appropriate metals will include, but are not limited to, the metals mentioned previously, and, particularly, titanium, various steels, nickel, copper, and silicon. The invention is applicable to ceramic and metal bodies of the types described of a wide variety of shape and dimensions, as will be understood by those skilled in the art.

To achieve the goals of the invention, the improved bonds or joints of the invention are composed of or comprise highly thermally stable compounds, i.e., compounds of high thermal stability. Selection of such materials provides joints or bonds according to the invention which will be stable and have good strength at elevated temperatures of from about 1000° C. to 1600° C. or more. Suitable bonding materials include, but are not limited to, various high melting or non-melting metal borides, carbides, carbonitrides, nitrides, silicides, intermetallic compounds, and ceramic matrix composites. Particularly preferred are SiC, TiC, $Si_3N_4$, TiN, WC, TiNi, $MoSi_2$, $Ti_5Si_3$, TiC—$TiB_2$, $MoB_2$, TiC—TiN, and $TiB_2$. The suitability of a given bonding material for bonding or joining particular surfaces is determined empirically. A particularly efficacious bond is achieved where the bonding material or compound to be formed in the procedure of the invention is compatible in chemical and thermophysical nature with the pieces or bodies to be joined.

Accordingly, solid reactants to form these materials will be chosen which, under suitable laser irradiation, will react to form the desired material. While normally the reactants will be provided in elemental form, it is within the scope of the invention to provide suitable compound reactants, and, of course, mixtures of elements and compounds may be used in a given case. Those skilled in the art will recognize, that, in selecting a compound reactant or reactants, the compound(s) chosen must not react to produce byproducts which interfere to any significant extent with the high temperature and other properties of the joint or bond. In this regard, it is further important that the reactants be provided in suitable ratios (normally stoichiometric or substantially so) so that a good quality bond is realized. However, it will be recognized that, because of imperfect mixture and diffusion of the reactants in the layer during irradiation, stoichiometric conversion of the reactants may not be achieved. Nevertheless, good bonding may be achieved if the "impurity" level, in terms of precursors and/or byproduct concentrations, does not exceed the solubility thereof in the layer or the joint composition formed or interfere substantially with the ability of the components of the layer during irradiation to wet the surfaces of the ceramic(s) or metal. In actuality, it has been determined that small quantities or minor amounts of some materials, commonly metals, may be used or mixed with the reactants with beneficial results. For example, a small quantity of elemental nickel powder in the reactant mixture of Ti and C serves as a diluent and does not participate in the reaction. Importantly, however, the additive nickel decreases the synthesis temperature (2937 K. for 0 wt %, to 2100 K. for 35 wt %). Such a decrease in reaction temperature, along with the presence of a neutral liquid phase, reduces thermal stress in the solidifying reactant product material and aids in densifying the joint. While not wishing to be bound by any theory of invention, it is believed that this is due, in the case of nickel in the example mentioned, to the formation of a eutectic having a titanium content of about 30 wt %. Because this Ti—Ni eutectic forms and lowers the melting point by about 1038 K., the carbon can be dissolved into the melt at a much lower temperature. Additionally, the interaction between the Ti and C becomes much faster and thus the rate of reaction propagation increases. In general, the limitation on any additive present is simply determined by the point at which its nature or concentration deleteriously affects the formation or highly thermally stable character of the bond of the invention.

Merely for illustration, and not by way of limitation, the additive, depending on the circumstances, may be present up to forty percent by weight of the bond, or more.

Preferably, the reactants, and any additive present, are supplied for bonding to the ceramic body or metal in the form of an intimate mixture of finely divided powders. Those skilled in the art can shape the mixture in any suitable way for handling. For example, the mixture may be pressed to form a body of suitable dimensions for mounting between the bodies to be joined. Particle sizes of from 2 μm to 150 μm, preferably 5 μm to 40 μm may be employed. Alternately, slurries or solutions of the reactants may be prepared, if possible, and dried in a shape suitable for use. Small quantities of binders, such as organic binders, may be used. The reactants may also be in the form of a foil held at the interface between the bodies, or they may be deposited as a layer of thin film of the various species. The formation of the ceramic bodies or metal to be joined forms no part of this invention, except that the surfaces to be joined may be cleaned or polished for good wetting before the irradiation of the invention. Commercially available ceramic or metal parts or bodies may be used.

According to the invention, the irradiation is conducted to initiate and maintain a reaction of the components in the layer between the bodies to be joined. Generally, the reactants will be selected so that the reaction is exothermic, but this is not a requirement if the laser beam is of sufficient intensity and if the layer is of limited thickness. In the case of an exothermic reaction, once initiated, the reaction may become self sustaining and propagate through the reactant mixture in the form of a combustion wave. In such case, it is an advantage of the invention that only a very small portion of the work must be "heated" to begin the joining process. Even in the case of an endothermic reaction, heating of the workpieces is substantially limited when compared with prior art methods. In one application, a first portion of the layer is irradiated to initiate and maintain the reaction throughout the depth or thickness of the layer. A second contiguous portion is then irradiated, while cooling or allowing the first portion to cool and begin forming a solid joint. This irradiation and cooling procedure is then continued on successive contiguous portions of the layer until a bond of desired dimension, normally the full length of the layer, is achieved. If a suitable tracking mechanism is employed, the "zone" of reaction may be moved progressively the length of the interposed layer so that uniform bonds of high thermal stability are achieved. Normally, providing additional cooling is unnecessary, but may be useful in a given circumstance.

The irradiation is conducted initially with sufficient intensity to heat the reactants and cause either the fusion of one or both of the reactants, or, if the heat is sufficient to initiate the reaction without fusion, the reaction produces a fused mixture which becomes, on cooling, the superior bond of the invention. It is a requirement of the invention that the irradiated layer fuse at some point in the irradiation so that wetting and bonding of the ceramic or ceramic and metal surfaces can occur. Accordingly, as those skilled in the art will understand, as the laser tracks the layer and the layer is irradiated sufficiently, the layer progressively fuses and/or reacts, and solidifies so that a wetting and bonding of the material of the layer with the ceramic or ceramic and metal surfaces takes place. Preferably, the ceramic or ceramic and metal bodies are preheated prior to the irradiation to reduce thermal stress.

As noted, the intensity and progression of the laser along the layer is regulated to fuse or allow fusion of the layer which, on cooling, creates the bond. Any suitable laser of high intensity may be used, but pulsed lasers are preferred. For example, ruby, Nd:Yag, Nd:glass, excimer, and $CO_2$ pulsed lasers may be used. This type of laser is preferred since precise control over laser processing parameters will produce a minimum reaction zone and minimum impact on the microstructure of the fusion zone in a given joint layer. A portion of the beam may be focused to provide the required intensity. In the illustration provided hereinafter, the beam is split, a portion of the beam being utilized to provide ancillary heating and prevent thermal stress of the layer and ceramic bodies in the area of the bond to be formed. While the type of laser is not critical, it is important that the laser energy density applied be appropriately selected or sufficient to provide the melting area and depth required. In the case of pulsed lasers, the pulse duration must also be considered to achieve the desired fusion. For example, for the case of a $CO_2$ pulsed laser, the optimum focused energy density with a Ti:C mixture would be 104.6 $J/cm^2$, and the optimum pulse duration to initiate the reaction with Ti:C would be between 300 msec. and 400 msec.

An important aspect of the invention is the additional heating that is supplied to the joint area by a second source. As mentioned, preheating is preferred. The type of heat source is a matter of choice as long as the source can provide sufficient heat to prevent thermal stress in the joint and the portions joined. The preheat and concurrent heating temperature level may be varied, depending on the materials joined, but generally will be maintained in a range of from about 200° C. to about 600° C. or more in the area of the joint to be formed or the joint being formed. This is, of course, insufficient to interfere significantly with the cooling that occurs to solidify the joint. In the illustration provided hereinafter, the second heat source is a defocused laser, but other types of heating mechanisms, such as radiant heaters, may be used.

BRIEF DESCRIPTION OF THE DRAWING

The drawing illustrates one suitable arrangement for laser induced reaction joining of ceramics to ceramics or metal.

DETAILED DESCRIPTION OF THE INVENTION

Accordingly, a laser source, such as a $CO_2$ pulsed laser, designated generally as L, provides a laser beam which enters a beam shaping optics system by entry into beam splitter 1. The beam shaping optics system includes beamsplitter 1, bending mirrors 2, 3, and 4, focusing lens 5, and defocusing lens 6. Beam splitter 1 is a 50–70% ZnSe beamsplitter and provides two separate beams for the purpose of igniting the interlayer exothermic reactant mixture and localized heating of the ceramic or metal pieces. The higher energy, focused beam ($E=4.15 \times 10^3$ J/cm2) is allowed to pass through focusing lens 5, a 10" focal length, AR coated ZnSe lens. Lens 5 serves the dual purpose of ignition and heating of the layer to be fused.

In the illustration, ceramic pieces or bodies to be joined, e.g. rectangular SiC pieces 30 mm×15 mm×3 mm, are supported by means, not shown, with a interlayer of a stoichiometric mixture of titanium powder (10 μm) and carbon powder (2 μm) between the pieces. The interlayer is a 30 mm×15 mm×0.5 mm generally rectangular insert of a mixture of the reactant powders in an organic vehicle (lacquer) which has been tape cast as a thin and flat, uniform layer on the surfaces to be joined. The insert is held in place by light pressure on the ceramic bodies. The interlayer is thus sized to be coextensive on two sides with the surfaces of the bodies to be joined, but may be slightly larger in thickness and length to allow for size decrease on conversion. The combination of ceramic bodies and interlayer is positioned such that the focal point of the focused beam lies on an exposed interlayer surface. The second beam from the beam splitter 1, a relatively weak beam, is directed generally to the bottom of the combination to be joined in the area of the layer. Defocusing lens 6 is a 5" focal length, AR coated ZnSe lens, and provides, as a second heat source, a wide beam for preheating and heating a large volume of the bodies in the region to be joined. The total beam power may be varied from 500 to 3000 watts. The pulse duty cycle is varied from 95% to 60% as the beam moves the length of the interlayer. Because the reaction of the titanium and carbon is exothermic, the reaction proceeds spontaneously through the layer to the bottom of the layer. Laser beam movement down the length of the interlayer is provided by a suitable tracking device (not shown). A composite body having a joint comprising TiC is produced, the joint having a 320 MPa strength, at elevated temperatures, comparable to that of the SiC bodies joined.

What is claimed is:

1. A process for joining ceramic bodies by a joint of high thermal stability comprising interposing between ceramic bodies a sufficient layer of a mixture of at least two materials which will react to form a compound having high thermal stability and which will bond to the surfaces of the ceramic bodies;

irradiating the layer with a laser of sufficient intensity to initiate and maintain reaction of the materials throughout the layer to form said compound having high thermal stability;

while concurrently supplying heat to the layer and the bodies from a second heat source to prevent thermal stress of the bodies and the joint being formed by the irradiation;

the ratio of the reactants in the mixture being initially proportioned so that the concentration of any unreacted materials or byproducts remaining in the joint composition formed does not interfere substantially with the wetting of the surfaces of the ceramic bodies or exceed solubility in the composition;

and cooling or allowing layer containing the compound of high thermal stability to cool and form a joint of high thermal stability.

2. The process of claim 1 wherein the layer and bodies to be joined are preheated.

3. The process of claim 1 wherein the compound of high thermal stability is selected from high melting or non-melting metal borides, carbides, carbonitrides, nitrides, silicides, intermetallic compounds, and those formed from ceramic matrix composites.

4. The process of claim 1 wherein the compound of high thermal stability is selected from SiC, TiC, $Si_3N_4$, TiN, WC, TiNi, $MoSi_2$, $Ti_5Si_3$, $TiC-TiB_2$, $MoB_2$, TiC-TiN, and $TiB_2$.

5. The process of claim 4 wherein the ceramic bodies are individually comprised of high temperature carbides, nitrides, silicides, or oxides.

6. The process of claim 4 wherein the ceramic bodies are comprised individually from p-alumina, magnesia, zirconia, spinel, titania, silicon carbide, silicon nitride, boron nitride, ceramic matrix composites.

7. The process of claim 1 wherein the mixture contains a minor amount of a metal non-reactant.

8. A process for joining ceramic and metal bodies by a joint of high thermal stability comprising interposing between the ceramic body and the metal body a sufficient layer of a mixture of at least two materials which will react to form a compound having high thermal stability and which will bond to the surfaces of the ceramic and metal bodies;

irradiating the layer with a laser of sufficient intensity to initiate and maintain reaction of the materials throughout the layer to form said compound having high thermal stability;

while concurrently supplying heat to the layer and the bodies from a second heat source to prevent thermal stress of the bodies and the joint being formed by the irradiation;

the ratio of the reactants in the mixture being initially proportioned so that the concentration of any unreacted materials or byproducts remaining in the joint composition formed does not interfere substantially with the wetting of the surfaces of the ceramic and metal bodies or exceed solubility in the composition;

and cooling or allowing layer containing the compound of high thermal stability to cool and form a joint of high thermal stability.

9. The process of claim 8 wherein the layer and bodies to be joined are preheated.

10. The process of claim 8 wherein the compound of high thermal stability is selected from high melting or non-melting metal borides, carbides, carbonitrides, nitrides, silicides, intermetallic compounds, and those formed from ceramic matrix composites.

11. The process of claim 8 wherein the compound of high thermal stability is selected from SiC, TiC, $Si_3N_4$, TiN, WC, TiNi, $MoSi_2$, $Ti_5Si_3$, $TiC-TiB_2$, $MoB_2$, TiC-TiN, and $TiB_2$.

12. The process of claim 11 wherein the ceramic bodies are individually comprised of high temperature carbides, nitrides, silicides, or oxides.

13. The process of claim 11 wherein the ceramic bodies are comprised individually from p-alumina, magnesia, zirconia, spinel, titania, silicon carbide, silicon nitride, boron nitride, ceramic matrix composites.

14. The process of claim 11 wherein the metal body comprises metals intended for high temperature application including pure metal, metal alloys, intermetallic compounds, and mixtures thereof.

15. The process of claim 14 wherein the metal is selected from titanium, steel, nickel, copper, and silicon.

16. The process of claim 11 wherein the metal is selected from titanium, steel, nickel, copper, and silicon.

17. The process of claim 8 wherein the mixture contains a minor amount of a metal non-reactant.

* * * * *